Patented Jan. 2, 1945

2,366,239

UNITED STATES PATENT OFFICE 2,366,239

CERTAIN WATER-SOLUBLE HIGH MOLAL OXYALKYLATED ESTERS, AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application July 7, 1941, Serial No. 401,384. Divided and this application March 9, 1943, Serial No. 478,593

12 Claims. (Cl. 260—404.5)

This invention relates to a new chemical product, our present application being a division of our pending application for Patent Serial No. 401,384, filed July 7, 1941, for Process for breaking petroleum emulsions, which subsequently matured as U. S. Patent No. 2,324,494, dated July 20, 1943.

One object of our invention is to provide a new chemical product or compound that is particularly adapted for use as a demulsifier in the resolution of crude oil emulsions.

Another object of our invention is to provide a practicable method for manufacturing said new chemical product or compound.

Although one of the primary objects of our invention is to provide a new compound or composition of matter that is an efficient demulsifier for crude oil emulsions of the water-in-oil type, the said compound or composition of matter may be employed in other arts, as hereinafter indicated.

The new chemical compound or composition of matter herein described is exemplified by the acidic, or preferably, neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated, for the sake of convenience, by the formula T.OH, in which T is an alcohol residue, is reacted with a polybasic carboxy acid, which, similarly, may conveniently be of the dibasic type and indicated by the formula HOOC.D.COOH, in which D is a dicarboxy acid residue, then the fractional ester obtained by reaction between equimolar quantities may be indicated by the following formula:

The polyethylene glycol may be characterized by materials of the kind such as heptaethylene glycol, octaethylene glycol, nonaethylene glycol, decaethylene glycol, to and including heptadecaethylene glycol. For convenience, these polyethylene glycols may be indicated by the following formula:

in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

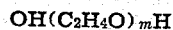

in which $m$ has its previous significance, and $n$ represents a numeral varying from 2 to 4.

Thus, the bulk of the materials herein contemplated, as demulsifiers, may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

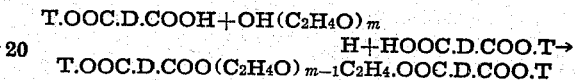

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned, largely, with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8–12 oxyalkylene groups, particularly 8–12 oxyethylene groups. Our preference to use the oxyethylated compounds is due, largely, to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly, minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely nonomeric. For convenience, such intermediate fractional ester may then be considered as a dibasic or polybasic acid. One mole of the intermediate fractional ester, so obtained, is then reacted with two moles of the alcoholic material of the kind subsequently described.

It is to be noted, however, that if one prepares a fractional acidic ester, and if two moles of the fractional acidic ester are reacted with one mole of the polyethylene glycol, there is no possibility for the formation of polymeric types of esterification products under ordinary conditions.

The hydroxylated compounds employed are hydroxylated acylated diamides containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical.

Detergent-forming acids having at least 8 and not more than 32 carbon atoms are exemplified by fatty acids, naphthenic acids, abietic acids, oxidized paraffin or wax acids, or the like, or by simple modifications thereof, which do not detract from the ability of the acid to combine with alkali to produce soap or soap-like materials. As to oxidized petroleum acids, see U. S. Patent No. 2,242,837, dated May 20, 1941, to Shields.

Thus, hydrogenated oleic acid, chlorinated naphthetic acid, or brominated abietic acid will form such detergent-forming bodies with the same ease as the parent materials themselves. The oxidized acids obtained by blowing or oxidation of the acids or esters, are satisfactory. Such acids have frequently been referred to collectively in the art as monocarboxy detergent-forming acids. Needless to say, the acylation need not be conducted by means of the acid itself, but may be conducted by means of any compound of the acid which contains the acid radical; for instance, an ester, an amide, an anhydride, an acyl chloride, etc.

It is our preference to use the fatty acids as the most desirable form of a detergent-forming acid, and particularly the unsaturated fatty acids, for instance, ricinoleic acid, oleic acid, mixed fatty acids derived from soyabean oil, rapeseed oil, sesame oil, cottonseed oil, corn oil, peanut oil, and the like. Fatty acids such as lauric acid, myristic acid, palmitic acid, and the like, may be employed.

The polybasic carboxy acids which may be employed include oxalic acid, malonic acid, succinic acid, glutaric acid, adipic acid, tricarballylic acid, fumaric acid, maleic acid, aconitic acid, malic acid, tartaric acid, citric acid, etc. Such acids may be conveniently referred to as low molal polybasic carboxy acids, or more preferably, low molal acids.

In regard to both the detergent-forming acids and in regard to the low molal acids, it is obvious that one need not use the acid itself as a reactant, but may use some suitable derivative, such as the acyl chloride, the anhydride, the ester, or amide; i. e., any suitable form may be used which is the functional equivalent in supplying the acyl radical.

Suitable primary and secondary amines which may be used as primary reactants include the following hydroxylated types; diethanolamine, monoethanolamine, ethyl ethanolamine, methyl ethanolamine, propanolamine, dipropanolamine, propyl propanolamine, etc. Other examples include cyclohexylolamine, dicyclohexylolamine, cyclohexyl ethanolamine, cyclohexyl propanolamine, benzylethanolamine, benzylpropanolamine, pentanolamine, hexanolamine, octylethanolamine, octadecylethanolamine, cyclohexanolethanolamine, etc.

If the low molal polycarboxy acid is selected so as to be hydroxylated, as in the instance of tartaric acid, citric acid, hydroxysuccinic acid, and the like, it is obvious that by esterifying a hydroxylated detergent-forming acid, for instance, ricinoleic acid, hydroxystearic acid, and the like, could be esterified therewith, i. e., with the hydroxyl group which is part of the low molal acyl radical one can employ the primary or secondary amine which need not be hydroxylated. Under these circumstances, one might employ compounds such as amylamine, diamylamine, butylamine, dibutylamine, benzylamine, cyclohexylamine, etc.

Other suitable types of amines will be described subsequently. For instance, one may employ the type involving the presence of an ether linkage, as, for example, the following:

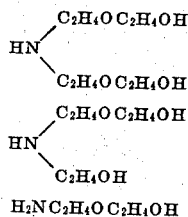

Subsequently, reference will be made to U. S. Patent No. 2,238,929, dated April 22, 1941, to Cahn and Harris. Momentarily attention is directed to the numerous amino compounds, particularly secondary hydroxylated amines there described. Such additional amino compounds are suitable as reactants, in view of what will be said subsequently.

In the aforementioned Cahn and Harris patent there is described certain materials which are employed in the manufacture of new compounds of the kind specifically contemplated in said Cahn and Harris patent. Said compounds are derived both from low molal monocarboxy acids and low molal polybasic carboxy acids. It may be well to illustrate both types, in order to understand clearly the manufacture of the intermediate products for use in obtaining the compositions of matter herein contemplated, and particularly, when manufactured for use as demulsifiers of water-in-oil emulsions.

Example A, part 1 of the aforementioned Cahn and Harris patent, will serve excellently as an initial illustration and is as follows:

"*Example A*

(1) 224 grams of methyl acetate (3 moles) and 210 grams of diethanolamine (2 moles) were mixed together, two layers forming at first, the mixture becoming a homogeneous mass after a short time. The mixture was refluxed for 19 hours at which time 90% of the diethanolamine had reacted. A portion of the reaction mixture was subjected to a vacuum of 6 millimeters at 60 degrees C., in order to drive off the volatile material, namely, the unreacted methyl acetate and the methyl alcohol which was formed during the reaction. The residue, upon titration, showed a content of 4.64% of free diethanolamine. To 192.5 grams of this residue, 34.7 grams of methyl acetate were added and the mixture was refluxed for 3½ hours. The resulting reaction product was then freed from its low boiling constituents, namely, the methyl alcohol and unreacted methyl acetate, by maintaining the mass at 70 degrees C. under a pressure of 6 millimeters. The residue contained approximately 0.8% of unreacted diethanolamine, based upon a determination of the alkalinity of said residue by titration. The product was a light yellow colored syrup, soluble in water, and contained a compound which was essentially the acetic acid amide of diethanolamine, having the following formula:

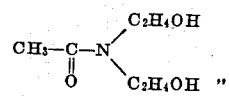

Having obtained a material of the kind above described, it is obvious that one can then esterify the material with either one or two moles of a detergent-forming monocarboxy acid, so as to obtain a hydroxylated derivative. Obviously, if the detergent-forming acid employed does not contain an alcoholic hydroxyl radical, for instance, if it is of the type other than that exemplified by ricinoleic acid, hydroxystearic acid, and the like, then one can only esterify one mole of such detergent-forming acid with a compound of the kind above described, for the reason that there must be a residual alcoholiform hydroxyl radical. If, however, an acid such as ricinoleic acid, hydroxystearic acid, or the like, is employed, then, of course, two moles of such detergent-forming acid can be employed. Similarly, if desired, one might esterify one hydroxyl with oleic acid, and the other hydroxyl with ricinoleic acid.

If the experiment above described is repeated, using monoethanolamine in the equivalent amount, then the final product is characterized by the following formula:

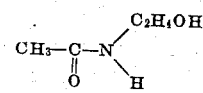

The limitations in regard to the above type of compound is perfectly obvious. Unless one can produce a secondary amide, which is difficult, and generally speaking, not particularly feasible, one must, of necessity, esterify with a hydroxylated detergent-forming acid, such as ricinoleic acid, hydroxystearic acid, or the like.

If, however, instead of using acetic acid, one uses lactic acid or some other hydroxylated low molal carboxy acid, acid, then the two formulas above described change to the following forms:

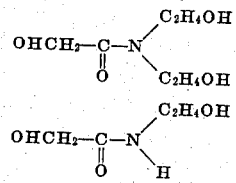

The presence of this additional hydroxyl offers additional opportunity for reaction, and further elaboration is not necessary, except perhaps, to point out that even a type of material such as the following:

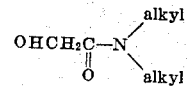

might be employed, provided that ricinoleic acid, for example, is esterified with the hydroxyl of the low molal monocarboxy acid acyl group. Other variants too numerous to mention suggest themselves, as, for example, derivatives of tris (hydroxymethyl) aminomethane, or similar types of compounds, such as an amide of the following type, which may be used for reaction with a detergent-forming acid:

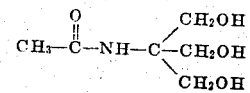

Again attention is directed to the aforementioned Cahn and Harris patent, insofar that it illustrates a large number of intermediate products which may be utilized to produce various final compositions of matter, as, for example, sulfated or sulfonated derivatives, as contemplated in said aforementioned U. S. Patent No. 2,238,929. However, the intermediate materials there described obviously can be used as alcoholic bodies in the preparation of compounds of the type herein contemplated. Such materials as there described are largely derivatives of hydroxylated secondary amines; but for the purposes herein contemplated, such limitation does not exist, in view of what has already been said. In the present instance, however, one is concerned with derivatives obtained from low molal polybasic carboxy acids of the kind described; and it is to be noted that, although many illustrations in the aforementioned Cahn and Harris patent are concerned with low molal monocarboxy acids, the corresponding low molal polybasic carboxy acid compound is readily obtainable, all of which will be obvious, in view of what is said subsequently.

The following is substantially the manufacturing procedure set forth in the Cahn and Harris patent, and which has been quoted in detail under the item previously identified as Example A, part 1:

One can employ one pound mole of diethyl oxalate and two pound moles of monoethanolamine and react these compounds in a similar manner. This procedure yields a corresponding diamide of oxalic acid, along with the liberation of two pound moles of ethyl alcohol. Such bis-(hydroxyethyl) oxalic acid diamide may be reacted with ricinoleic acid in the ratio of one pound mole of the diamide for 2 pound moles of ricinoleic acid. Similarly, a product can be obtained employing only one mole of ricinoleic acid for one mole of the diamide; or one might employ one mole of oleic acid and one mole of ricinoleic acid for each mole of the diamide. Similarly, diethanolamine, may be employed with diethyl oxalate to give the corresponding tetra(hydroxyethyl) oxalic acid diamide. Instead of diethyl oxalate, diethyl maleate, or numerous other reactants can be employed. Attention is called to the fact that hydroxylated polybasic carboxy acids might be employed in the same manner as hydroxyacetic acid can be employed in the analogous type of compound where a low molal monocarboxy acid is used.

By way of illustration, the following examples will serve:

Hydroxylated Diamide Type Intermediate

*Example 1*

One pound mole of a diamide of the following formula:

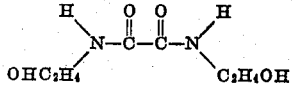

is esterified with one pound mole of ricinoleic acid until esterification is complete. Such esterification reaction can be conducted by any one of the conventional means, usually heating at a temperature above the boiling point of water; for instance, 116–160° C. is sufficient. In some cases it may be desirable to pass a dried inert gas through the reacting mass, as, for example, dried carbon dioxide or dried nitrogen. Sometimes the reaction is extended by the presence of a small amount of a sulfonic acid as a catalyst, for instance, ½% of toluene sulfonic acid. In other instances, esterification may be conducted in the presence of an inert solvent, such as xylene, which is permitted to distil off, carrying water vapor with it. The vapors are condensed, separation of water and xylene permitted to take place, and the xylene returned to the reacting vessel while the water is diverted to a suitable draw-off connection.

Hydroxylated Diamide Type Intermediate

*Example 2*

One pound mole of oleic acid is substituted for one pound mole of ricinoleic acid in the preceding example.

Hydroxylated Diamide Type Intermediate

*Example 3*

One pound mole of naphthenic acid is substituted for ricinoleic acid in Example 1, preceding.

Hydroxylated Diamide Type Intermediate

*Example 4*

Two pound moles of ricinoleic acid are substituted for one pound mole of ricinoleic acid in Example 1, preceding.

Hydroxylated Diamide Type Intermediate

*Example 5*

One pound mole of oleic acid and one pound mole of ricinoleic acid are substituted for one pound mole of ricinoleic acid in Example 1, preceding.

Hydroxylated Diamide Type Intermediate

*Example 6*

The diamide derived from diethanolamine and diethyl oxalate of the following composition:

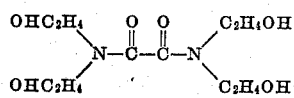

is substituted for the amide in Examples 1–5, preceding.

Hydroxylated Diamide Type Intermediate

*Example 7*

One pound mole of diethyl oxalate is reacted with one pound mole of monoethanolamine and one pound mole of diethanolamine to give a mixture containing some diamides of the types described in the preceding examples, and also having present an appreciable amount of a diamide of the following composition:

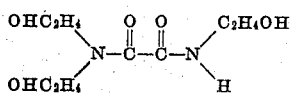

Such reactant is employed in the manner suggested in Examples 1–5, preceding.

Hydroxylated Diamide Type Intermediate

*Example 8*

Monopropanolamine and dipropanolamine are employed to give compounds comparable to those described in Examples 1–7, preceding.

HYDROXYLATED DIAMIDE TYPE INTERMEDIATE
Example 9

One pound mole of diethyl oxalate is reacted with tris(hydroxymethyl)aminomethane to give a diamide of the following composition:

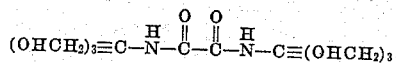

Such diamide is substituted in the previous examples, such as 1-5, inclusive.

HYDROXYLATED DIAMIDE TYPE INTERMEDIATE
Example 10

Diethyl maleate is substituted for diethyl oxalate in Examples 1-9, preceding.

Having obtained hydroxylated acylated amide compounds of the kind previously described, the next step, of course, is to obtain fractional esters derived from nonaethylene glycol of the kind described in the earlier part of the present disclosure. Such materials may be illustrated by the following:

GLYCOL ESTER INTERMEDIATE PRODUCT
Example 1

One pound mole of nonaethylene glycol is treated with two pound moles of maleic anhydride, so as to form nonaethylene glycol dihydrogen dimaleate.

GLYCOL ESTER INTERMEDIATE PRODUCT
Example 2

A mixture of lower non-distillable polyethylene glycols, representing approximately deca- to tetradecaethylene glycol, is substituted for nonaethylene glycol in the preceding example.

GLYCOL ESTER INTERMEDIATE PRODUCT
Example 3

A 50-50 mixture of nonaethylene glycol and lower non-distillable polyethylene glycols of the kind described in the previous example is substituted for nonaethylene glycol in Example 1.

GLYCOL ESTER INTERMEDIATE PRODUCT
Example 4

Adipic acid is substituted for maleic anhydride in Examples 1-3, preceding.

GLYCOL ESTER INTERMEDIATE PRODUCT
Example 5

Oxalic acid is substituted for maleic anhydride in Examples 1-3, preceding.

GLYCOL ESTER INTERMEDIATE PRODUCT
Example 6

Citric acid is substituted for maleic anhydride in Examples 1-3, preceding.

GLYCOL ESTER INTERMEDIATE PRODUCT
Example 7

Succinic anhydride is substituted for maleic anhydride in Examples 1-3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen, or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, dated March 30, 1937, to Frasier.

Sometimes esterification is conducted most readily in the presence of an inert solvent, that carries away the water of esterification which may be formed, although as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well known procedure and requires no further elaboration.

COMPOSITION OF MATTER
Example 1

Two pound moles of a material of the kind exemplified by Hydroxylated diamide type intermediate, Example 1, preceding, are reacted with one pound mole of a glycol ester intermediate product of the kind described under Glycol ester intermediate products, Example 1, 2 and 3, preceding. Such reaction is continued until all carboxyl acidity has disappeared. The time of reaction may vary from a few hours to as many as 20 hours.

COMPOSITION OF MATTER
Example 2

The same procedure is followed as in Composition of matter, Example 1, except that one employs a hydroxylated diamide type intermediate product described in Hydroxylated diamide type intermediate, Example 2, preceding, instead of in Example 1.

COMPOSITION OF MATTER
Example 3

The same procedure is followed as in Composition of matter, Example 1, except that one employs a material of the kind described in Hydroxylated diamide type intermediate, Example 3, preceding, instead of in Example 1.

COMPOSITION OF MATTER
Example 4

The same procedure is followed as in Composition of matter, Example 1, except that one employs a material of the kind described in Hydroxylated diamide type intermediate, Example 4, preceding, instead of in Example 1.

COMPOSITION OF MATTER
Example 5

The same procedure is followed as in Composition of matter, Example 1, except that one employs a material of the kind described in Hydroxylated diamide type intermediate, Example 5, preceding, instead of in Example 1.

COMPOSITION OF MATTER
Example 6

The same procedure is followed as in Composition of matter, Example 1, except that one employs a material of the kind described in Hydroxylated diamide type intermediate, Example 6, preceding, instead of in Example 1.

COMPOSITION OF MATTER

*Example 7*

The same procedure is followed as in Composition of matter, Example 1, except that one employs a material of the kind described in Hydroxylated diamide type intermediate, Example 7, preceding, instead of Example 1.

COMPOSITION OF MATTER

*Example 8*

The same procedure is followed as in Composition of matter, Example 1, except that one employs a material of the kind described in Hydroxylated diamide type intermediate, Example 8, preceding, instead of Example 1.

COMPOSITION OF MATTER

*Example 9*

The same procedure is followed as in Composition of matter, Example 1, except that one employs a material of the kind described in Hydroxylated diamide type intermediate, Example 9, preceding, instead of Example 1.

COMPOSITION OF MATTER

*Example 10*

The same procedure is followed as in Composition of matter, Example 1, except that one employs a material of the kind described in Hydroxylated diamide type intermediate, Example 10, preceding, instead of Example 1.

COMPOSITION OF MATTER

*Example 11*

Glycol ester intermediate products of the kind described by Examples 4-7, preceding, are substituted for Glycol ester intermediate products, 1, 2, and 3, in the preceding ten examples.

In reviewing what has been said, it is obvious that a wide range in carbon atom content exists in regard to the alcoholic bodies employed for reaction with the glycol dihydrogen diacid ester. This may be illustrated by the following examples:

If oxalic acid or ethyl oxalate is reacted with monoethanolamine, the compound previously depicted contains only 6 carbon atoms. If such product is then reacted with one mole of octanoic acid, the alcoholic body contains a total of 14 carbon atoms. On the other hand, a product derived from oxalic acid and diethanolamine has 10 carbon atoms; and if one introduces 4 ricinoleyl radicals, one adds 72 more carbon atoms. Indeed, similar derivatives suggest themselves, whereby three ricinoleyl radicals are introduced, thus adding 54 carbon atoms in each half of the alcoholic radical, or each amide group of the diamide. With this in mind, it is obvious that rather large molecularly sized alcoholic materials can be obtained, if desired. Thus, it is possible that such compounds contain in excess of 100 carbon atoms; indeed, 125–150 carbon atoms, would be present in a number of compounds which readily suggest themselves, in view of what has been said.

It is to be noted that this second step is an esterification reaction, and the same procedure is employed, as suggested above, in the preparation of the intermediate product. Needless to say, any particular method may be used to produce the desired compounds of the kind indicated. In some instances, it may be desirable to conduct the esterification reaction in the presence of a non-volatile inert solvent which simply acts as a diluent or viscosity reducer.

In the preceding examples, attention has been directed primarily to the monomeric form, or, at least, to the form in which the bifunctional alcohol, i. e., a glycol, and the polyfunctional acid, usually a bifunctional compound, react to give a chain type compound, in which the adjacent acid and glycol nucleus occur as a structural unit. For instance, in the monomeric form this may be indicated in the following manner:

$$\text{acid} \ldots \text{glycol} \ldots \text{acid}$$

If, however, one prepared an intermediate product employing the ratio of three moles of maleic anhydride and two moles of nonaethylene glycol, the tendency would be to produce a product which might be indicated in the following manner:

$$\text{acid} \ldots \text{glycol} \ldots \text{acid} \ldots \text{glycol} \ldots \text{acid}$$

Similarly, three moles of the glycol and four moles of the acid might tend to give a combination which may be indicated thus:

$$\text{acid} \ldots \text{glycol} \ldots \text{acid} \ldots \text{glycol} \ldots \text{acid} \ldots \text{glycol} \ldots \text{acid}$$

Another way of stating the matter is that the composition may be indicated in the following manner:

$$\text{TOOC.D.COO}[(C_2H_4O)_{m-1}C_2H_4OOC.D.COO]_xT$$

in which the characters have their previous significance and $x$ is a relatively small whole number less than 10 and probably less than 5; and in the monomeric form $x$, of course, is 1. The limitations on the size of $x$ are probably influenced, largely, by the fact that reaction leading to further growth is dependent upon random contact.

Some of the products are self-emulsifiable oils, or self-emulsifiable compounds; whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid; and (d) By using an alcoholic reactant of lower molecular weight, or one having more hydroxyl groups, or possibly, having one or more ether groups.

Indeed, in many instances, the hydroxylated body may show some tendency towards water solubility, or self-emulsification, prior to reaction with a glycol ester. It is to be noted in this instance that the hydroxylated materials which are employed prior to reaction with the glycol ester are largely of the water-insoluble type; but in such instances where they are self-emulsifiable, or show hydrophile properties, they are equally suitable.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken, so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Materials of the kind herein contemplated may find uses as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellent textile finish, etc. These uses are by no means exhaustive.

However, the most important phase of the present invention, as far as industrial application goes, is concerned with the use of the materials previously described as demulsifiers for water-in-oil emulsions, and more specifically, emulsions of water or brine in crude petroleum.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent #2,226,119, dated December 24, 1940, to De Groote and Keiser. As to using compounds of the kind herein described as demulsifiers, or in particular as surface tension depressants, in combination with mineral acid or acidization of oil-bearing strata, reference is made to U. S. Patent No. 2,233,383, dated February 25, 1941, to De Groote and Keiser.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances, gives increased resistance, to soluble calcium and magnesium salts, for such property is of particular value. Usually, however, neutralization with a dilute solution of ammonia or the like is just as practicable and less expensive.

In the hereto appended claims it is intended that the monomeric forms contemplate also the polymeric forms, insofar that the polymeric forms are nothing more or less than a repetition of the monomeric forms several times over, with the loss of one or more moles of water.

What has just been said can be recapitulated and presented in more formal agreement with customary nomenclature in the following manner: As stated previously in the broadest aspect the polyalkylene glycols employed may be indicated by the following formula:

in which $m$ has its previous significance, and $n$ represents a numeral varying from 2 to 4. In simpler form this structure can be indicated in the following manner:

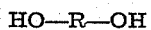

in which the divalent radical —RO— is the divalent radical —$(C_nH_{2n}O)_m$— as previously defined.

The dibasic acid previously referred to in its simplest form as HOOC.D.COOH, is more completely portrayed by the following formula:

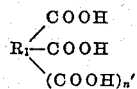

in which $R_1$ is the polybasic carboxy acid residue, except in the unique case of oxalic, and $n'$ is the numeral 0 or 1, depending on whether or not the polybasic acid is dibasic or tribasic.

If the polybasic acid just described is indicated by R', and if the glycol just described is indicated by R", then the acidic or fractional ester previously described in the specification may be indicated by the following formula:

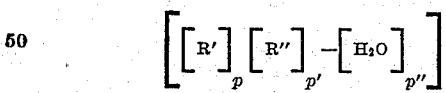

in which $p$ and $p'$ represent numerals varying from 1 to 10, and $p''$ represents a numeral varying from 1 to 20, and R' and R" have their prior significance, and the ratio of $p$ to $p'$ varies from 2:1 to $p+1$; $p'$, with the obvious proviso that such ester must contain at least two free carboxyl radicals.

Previous reference has been made to the alcoholic compound which is a hydroxylated, acylated diamide containing:

(a) An acyl radical derived from a polybasic carboxy acid having not more than 6 carbon atoms, and the acyl radical thereof linked to two amine nitrogen atoms;
(b) An acyl radical derived from a detergent-forming monocarboxy acid having at least 8 and not more than 32 carbon atoms; and
(c) An alcoholiform hydroxyl radical.

In examining the previous examples, it is to be noted that the number of hydroxyl radicals present as part of the hydroxylated acylated diamide may be as many as six.

In other instances there may be present a single alcoholic hydroxy radical.

Thus, the hydroxylated acylated diamide herein contemplated may be indicated by the formula:

$$R_2(OH)_{n''}$$

in which the hydroxylated acylated diamide radical $R_2$ contains (a) An acyl radical derived from a polybasic carboxy acid having not more than six carbon atoms, and the acyl radical thereof linked to two amine nitrogen atoms;

(b) An acyl radical derived from a detergent-forming monocarboxy acid having at least 8 and not more than 32 carbon atoms; and (c) An alcoholiform hydroxyl radical, and $n''$ is a small whole number varying from 1 to 6.

The new composition of matter herein contemplated is best represented as an ester obtained by the esterification reaction involving the acidic fractional ester above described, and the hydroxylated acylated amide previously depicted in detail. The final composition may be obtained in any suitable manner and would properly represent the final product, regardless of the succession of the intermediate steps. So portrayed the structural formula is as follows:

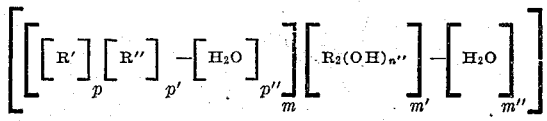

in which all of the characters have their prior significance, and $m$ represents a numeral from 1 to 6, $m'$ represents a numeral from 1 to 3, and $m''$ represents a numeral varying from 1 to 6.

It has been previously pointed out that in residual carboxylic radicals, and especially one obtained from tribasic acids, it could be neutralized with a variety of suitable basic materials. In other words, a residual carboxylic hydrogen atom may be replaced by a metallic atom, an ammonium radical, or substituted ammonium radical, as previously indicated. Under such circumstances, any residual carboxylic radical, instead of appearing thus: COOH, may, in essence, be the radical $COOR_3$ in which $R_3$ represents a cation including the acidic hydrogen atom.

This can best be disposed of by rewriting the formula for the polybasic carboxy acid, thus:

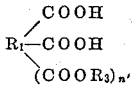

in which all of the characters have their previous significance.

Attention is directed to the fact that the alcoholiform hydroxyl radical may be part of the high molal acyl radical, or part of the polybasic carboxy acid, or part of the amino-hydrogen atom constituent.

Having thus described our invention, what we claim as new and desire to secure by Letters Patent is:

1. A water-soluble ester of the formula:

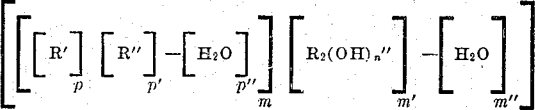

in which $m$ represents the numeral 1 to 6, $m'$ represents the numeral 1 to 3, and $m''$ represents the numeral from 1 to 6; and in which $p$ and $p'$ represent numerals varying from 1 to 10, and the ratio of $p$ to $p'$ varies from 2:1 to $p+1:p'$, and $p''$ represents a numeral varying from 1 to 20, and $R'$ is a glycol of the formula HO—R—OH in which the divalent radical —RO— is the divalent radical $—(C_nH_{2n}O)_m—$ in which radical, in turn, $n$ represents a numeral varying from 2 to 4, and $m$ represents a numeral from 7 to 17; and $R''$ is the polycarboxy acid:

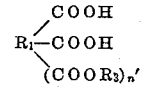

in which $R_1$ is the polybasic carboxy acid residue, and $R_3$ represents a cation including the acidic hydrogen atom, and $n'$ is the numeral 0 to 1; $R_2(OH)_{n''}$ is a hydroxylated acylated diamide in which the hydroxylated acylated diamide radical $R_2$ contains (a) An acyl radical derived from a polybasic carboxy acid having not more than 6 carbon atoms, and the acyl radical thereof linked to 2 amine nitrogen atoms;

(b) An acyl radical derived from a detergent-forming monocarboxy acid having at least 8 and not more than 32 carbon atoms; and (c) An alcoholiform hydroxyl radical, and $n''$ is a small whole number varying from 1 to 6.

2. A water-soluble ester, as defined in claim 1, wherein all occurrences of $n'$ are 0.

3. A water-soluble ester, as defined in claim 1, wherein all occurrences of $n'$ are 0, and $n$ represents the numeral 2.

4. A water-soluble ester, as defined in claim 1, wherein all occurrences of $n'$ are 0, $n$ represents the numeral 2, and $m$ represents a numeral varying from 7 to 11.

5. A water-soluble ester, as defined in claim 1, wherein all occurrences of $n'$ are 0, $n$ represents the numeral 2, and $m$ represents a numeral varying from 7 to 11, and the high molal acyl radical which is part of $R_2$ is an 18 carbon atom fatty acid residue.

6. A water-soluble ester, as defined in claim 1, wherein all occurrences of $n'$ are 0, $n$ represents the numeral 2, $m$ represents a numeral varying from 7 to 11, and the high molal acyl radical which is part of $R_2$ is an 18 carbon atom fatty acid residue, and the ratio of $p$ to $p'$ is 2 to 1.

7. A water-soluble ester, as defined in claim 1, wherein all occurrences of $n'$ are 0, $n$ represents the numeral 2, $m$ represents a numeral varying from 7 to 11, and the high molal acyl radical which is part of $R_2$ is an 18 carbon atom fatty acid residue, the ratio of $p$ to $p'$ is 2 to 1, and with added neutralization of all residual acidity.

8. A water-soluble ester, as defined in claim 1, wherein all occurrences of $n'$ are 0, $n$ represents the numeral 2, $m$ represents a numeral varying from 7 to 11, and the high molal acyl radical which is part of $R_2$ is a ricinoleic acid residue, the ratio of $p$ to $p'$ is 2 to 1, and with added neutralization of all residual acidity.

9. A water-soluble ester, as defined in claim 1, wherein all occurrences of $n'$ are 0, $n$ represents the numeral 2, $m$ represents a numeral varying from 7 to 11, and the high molal acyl radical which is part of $R_2$ is a ricinoleic acid residue, the ratio of $p$ to $p'$ is 2 to 1, with added neutralization of all residual acidity, and $R_1$ is an adipic acid residue.

10. A water-soluble ester, as defined in claim 1, wherein all occurrences of $n'$ are 0, $n$ represents the numeral 2, $m$ represents a numeral varying from 7 to 11, and the high molal acyl radical which is part of $R_2$ is a ricinoleic acid residue, the ratio of $p$ to $p'$ is 2 to 1, with added neutralization of all residual acidity, and $R_1$ is a succinic acid residue.

11. A water-soluble ester, as defined in claim 1, wherein all occurrences of $n'$ are 0, $n$ represents the numeral 2, $m$ represents a numeral varying from 7 to 11, and the high molal acyl radical which is part of $R_2$ is a ricinoleic acid residue, the ration of $p$ to $p'$ is 2 to 1, with added neutralization of all residual acidity, and $R_1$ is a maleic acid residue.

12. In the manufacture of an esterification product of the kind described in claim 1, the steps of: (A) esterifying a polyalkylene glycol having at least 7 and not more than 17 ether linkages, and the alkylene radical thereof containing at least 2 and not more than 6 carbon atoms, with a polybasic carboxy acid having not more than 6 carbon atoms, in the predetermined ratio of more than one and not more than 2 moles of the polybasic acid for each mole of the glycol to produce a water-soluble compound; (B) esterifying one molal proportion of said alkylene glycol dihydrogen acid ester with two moles of a hydroxylated acylated diamide containing: (a) an acyl radical derived from a polybasic carboxy acid having not more than 6 carbon atoms, and the acyl radical thereof linked to two amino nitrogen atoms; (b) an acyl radical derived from a detergent-forming monocarboxy acid having at least 8 and not more than 32 carbon atoms; and (c) an alcoholiform hydroxyl radical.

MELVIN DE GROOTE.
BERNHARD KEISER.